United States Patent
Petner et al.

(10) Patent No.: US 8,497,595 B1
(45) Date of Patent: Jul. 30, 2013

(54) SURFACE WIND POWER GENERATION ARRAY

(75) Inventors: Michael F. Petner, Cherry Hill, PA (US); Gregory T. Daly, Glendora, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 546 days.

(21) Appl. No.: 12/618,870

(22) Filed: Nov. 16, 2009

(51) Int. Cl.
*F03D 9/00* (2006.01)
*H02P 9/04* (2006.01)

(52) U.S. Cl.
USPC .............................................. 290/55

(58) Field of Classification Search
USPC ........................ 290/42–44, 53–55
See application file for complete search history.

(56) References Cited

U.S. PATENT DOCUMENTS

| | | | |
|---|---|---|---|
| 5,552,657 A | 9/1996 | Epstein et al. | |
| 6,825,574 B1 | 11/2004 | Mooring | |
| 7,215,037 B2 * | 5/2007 | Scalzi | 290/55 |
| 7,547,984 B2 | 6/2009 | Fein et al. | |
| 8,035,245 B1 * | 10/2011 | Simnacher | 290/55 |
| 2008/0122312 A1 | 5/2008 | Dickson | |
| 2008/0148549 A1 | 6/2008 | Fein et al. | |
| 2008/0149403 A1 | 6/2008 | Fein et al. | |
| 2008/0150284 A1 | 6/2008 | Fein et al. | |
| 2008/0150286 A1 | 6/2008 | Fein et al. | |
| 2008/0150288 A1 | 6/2008 | Fein et al. | |
| 2008/0150289 A1 | 6/2008 | Fein et al. | |
| 2008/0150290 A1 | 6/2008 | Fein et al. | |
| 2008/0150291 A1 | 6/2008 | Fein et al. | |
| 2008/0150298 A1 | 6/2008 | Fein et al. | |
| 2008/0152492 A1 | 6/2008 | Fein et al. | |

FOREIGN PATENT DOCUMENTS

| | | |
|---|---|---|
| DE | 19924506 A1 | 11/2000 |
| ES | 2 020 711 A6 | 9/1991 |
| KR | 10-2008-0013569 A | 2/2008 |

OTHER PUBLICATIONS

Advanced Cerametrics Incorporated brochure re "Actuators—Active Fiber Composites (AFC) Actuators", 2 pgs.
"Affordable DIY Solar and Wind", EARTH4ENERGY.com, http://peswiki.com/index.php/Directory: Rick_Dickson: Wind_Tree, printed Jun. 23, 2009.
Advanced Cerametrics Incorporated brochure re "Actuators - Active Fiber Composites (AFC) Actuators", 2 pgs. No date.

* cited by examiner

*Primary Examiner* — Javaid Nasri
(74) *Attorney, Agent, or Firm* — Howard IP Law Group, PC (57) ABSTRACT

An energy generation system is disclosed, comprising a blade portion, a magnet portion and a coil portion. The blade is an elongated member positioned so as to be subject to ground-level wind forces. The blade is connected to the magnet portion so that the magnet portion oscillates as the blade is moved by the wind forces. The magnet portion may be disposed within the coil portion to induce a current in the windings of the coil portion as the magnet portion reciprocates/oscillates. A plurality of individual blade/magnet/coil combinations may be provided in a modular array to generate electricity independent of wind direction and with minimal wind intensity. A plurality of interconnecting modular arrays may be provided in a grid to supply the desired voltage and amperage levels. The array grid may conform to the local topology of the installation site, thus eliminating the need to level the site. The disclosed system can be made aesthetically pleasing by fabricating it to resemble a field of grass, reeds, wheat, etc., thus allowing it to blend in with the natural landscape.

25 Claims, 7 Drawing Sheets

SURFACE WIND POWER GENERATION ARRAY

FIELD OF THE INVENTION

The invention generally relates to clean power generation systems, and more particularly to systems for generating power from wind forces acting at or near the surface of the earth.

BACKGROUND OF THE INVENTION

Clean or renewable energy generation systems exploit the natural forces of water (i.e., hydroelectric, tidal and wave), geothermal, sun and wind to generate electricity in a way that intends to cause little or no adverse impact to the surrounding environment. Present approaches to clean/renewable energy have not met with widespread or long term adoption. Fewer dams are being built for generating hydroelectric power due to the lack of suitable sites and ecosystem concerns, and while solar power technologies have shown promise, they remain costly when compared to the costs of electricity produced by fossil fuels (i.e., oil, natural gas, and coal). Wind power technologies, likewise, have to this point been too costly to foster widespread adoption. An additional hindrance to the acceptance of wind power is the aesthetic impact of large-scale wind turbines on the surrounding landscape, which often leads to popular resistance when such turbines are suggested for installation in or near residential areas.

Power generated by wind turbines is the most highly developed of the renewable resource energy capture and conversion technologies. Wind turbines are typically located several hundred feet in the air to take advantage of the relatively higher wind velocities that exist at higher altitudes where the lower level effects of the boundary layer—the portion of the atmosphere near the earth's surface where wind speed is retarded by frictional forces—are reduced or eliminated. The placement of wind turbines at high heights is also a logical choice because wind shear, or the change in wind speed with height, intensifies as the height above the ground increases.

Nonetheless, a large amount of useable wind energy (i.e., energy that can be converted into electrical power) resides within the lower levels of the boundary layer down to the surface or interfacial sublayer of the earth. One need only observe the movement of grass blades or reeds in the breeze to realize that substantial energy is available for conversion.

It would be desirable to provide a power generation system that can efficiently capture ground-level wind energy and convert it to electricity. It would also be desirable to provide a power generation system that has minimal aesthetic impact on the surrounding environment. It would further be desirable to provide small wind power generators each having a very small form factor to enable the fabrication of a vast generator grid that could be formed to resemble fields of grass, reeds, etc.

SUMMARY OF THE INVENTION

The disclosure provides a system for harnessing wind energy that exists at ground level and converting it into useable electricity. Due to the random directional nature, variable intensity, and turbulence of surface winds, a manner of conversion other than a turbine is needed to efficiently capture and convert this energy. The disclosed system includes an array of surface-wind generators that can generate electricity independent of wind direction and with minimal wind intensity. These arrays can be connected together into a grid which follows the natural topology of the site on which it is located. The arrays forming the grid can be electrically connected together in both series and parallel configurations to produce the required voltage and current levels. In addition, the disclosed system can be made aesthetically pleasing by fabricating it to resemble a field of grass, reeds, wheat, etc., thus allowing it to blend in with the natural landscape. The ability of the disclosed system to integrate with its natural surroundings is expected to enhance adoption by better enabling land owners to overcome zoning restrictions, gain endorsement of environmental groups, and reduce opposition by residents who will live in proximity to the system.

For optimal integration into the natural surroundings, the grid of individual generator arrays can be configured to follow the natural contours of the land on which they are deployed, thus giving the grid the appearance of "rolling hills" of grass or wheat. The system can also be adapted to otherwise unusable land situated on hillsides and deserts, so as to capitalize on the surface winds traversing these areas. In addition, the system can be adapted to unused areas of roofs or other structures that would otherwise be unproductive.

A system is disclosed for generating electricity. The system may comprise a blade portion, a magnet portion, and a coil portion. The blade portion may be associated with the magnet portion such that movement of the blade portion causes movement of the magnet portion. The magnet portion may be disposed in relation to the coil portion such that movement of the magnet portion induces a current in the coil portion.

A system is further disclosed for generating electricity. The system may comprise a plurality of generators, each generator comprising a blade portion, a magnet portion, and a coil portion. Each blade portion may be connected to an associated magnet portion such that movement of the blade portion causes movement of the magnet portion. Each magnet portion may be disposed in relation to an associated coil portion such that movement of the magnet portion induces a current in the coil portion. The system may further comprise a diode rectifier at an output of the coil portions to convert AC current to DC current for energy storage or a power electronic interface (such as a pulse-width modulation (PWM) converter) for direct connection to the national electrical grid.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts, and further wherein.

DETAILED DESCRIPTION

In the accompanying drawings, like items are indicated by like reference numerals. This description of the preferred embodiments is intended to be read in connection with the accompanying drawings, which are to be considered part of the written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In general, the disclosed system comprises a plurality of individual generators that can be powered by ground-level winds. The generators each have an associated upright blade configured to catch the wind regardless of the wind direction. The wind moves the blade, which in turn, moves a magnet attached to the base of the blade. A coil surrounds or is positioned adjacent to the magnet such that when the magnet moves, a small electric current is generated. The blades are counterbalanced and self-righting to facilitate a constant return to the optimal orientation for capturing the next traversing wind. In addition, for constant and steady wind conditions, a wind induced twisting motion of the blade when in a near-horizontal position to the wind stream is envisioned. This twisting motion is caused by the aerodynamic design of the blade and is intended to return the blade to its optimal orientation prior to the full force of the wind acting on the blade again and repeating the movement cycle. The base portions of the individual generators are of modular configuration and are designed for one-step plug-in into the array frame. This one step plug-in forms the physical connection to the frame, as well as the necessary electrical connection. The frame contains an electrical bus which interconnects the individual generators within the array together, and also functions as the basis for connecting other arrays together to form a grid. Individual arrays can be plugged together to form a scalable grid that accommodates the installation site.

An array of such electrical generators does not depend on the direction of the wind or a significant wind intensity to generate electricity.

Figure 1:
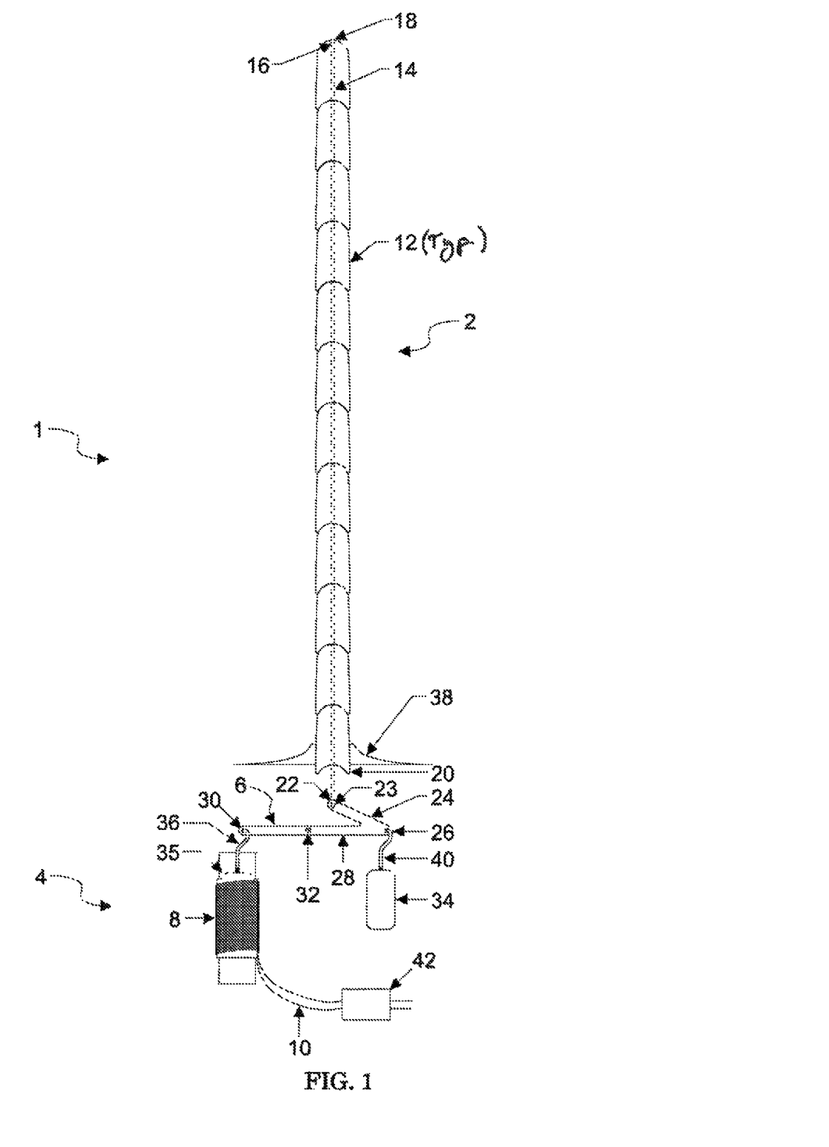
FIG. 1 is a side view of a first exemplary embodiment of a novel wind energy conversion system.

Referring now to FIG. 1, a wind generator 1 may comprise an upright cantilevered blade portion 2 and a generator portion 4. A linkage 6 may be disposed between the blade portion 2 and the generator portion 4 to translate the movement of the blade portion 2 to the generator portion 4. The generator portion 4 may consist of a magnet 35 located within a coil portion 8 so that movement of the magnet 35 within the coil portion 8 induces an electric current in the coil portion 8. The coil portion 8 may be connected via suitable wiring 10 to a diode rectifier or pulse-width modulation converter 42 for proper conditioning of the electrical current prior to placement on the array electrical bus and eventual distribution via the interconnected array busses forming the overall array grid.

As is apparent in FIG. 1, the blade portion 2 may comprise a series of articulated blade elements 12 which enable the blade portion 2 to bend (FIG. 2) in response to an applied wind force. The articulated blade elements 12 may be hollow to accommodate a line 14 disposed within the blade portion 2, and which runs the length of the blade portion 2. A distal end 16 of this line 14 may be fixed to the blade portion 2 at or near the top 18 of the portion 2. The line 14 is provided in sufficient length to exit the bottom 20 of the blade portion 2 where a proximal end 22 of the line engages the linkage 6.

In one embodiment, the line 14 comprises aramid (e.g., Kevlar) fiber cordage. It will be appreciated, however, that any of a variety of materials can be used to form the line 14. Further, the line 14 may be provided as a monofilament, or it may be multi-stranded (i.e., a cord). The line 14 may have a length of a few inches (where the generator is configured to approximate a blade of grass) or it may have a length of several feet (where the generator is configured to approximate a reed). It will be appreciated that these lengths are not critical or limiting, and any length can be used to achieve a desired configuration for the wind generator 1.

Figure 3:
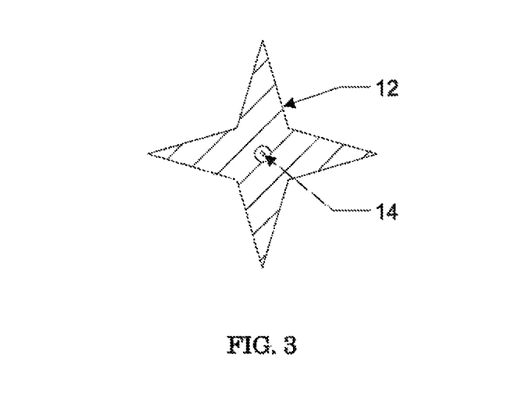
FIG. 3 is a cross-section of an exemplary blade member of the system of FIG. 1.
Figure 8:
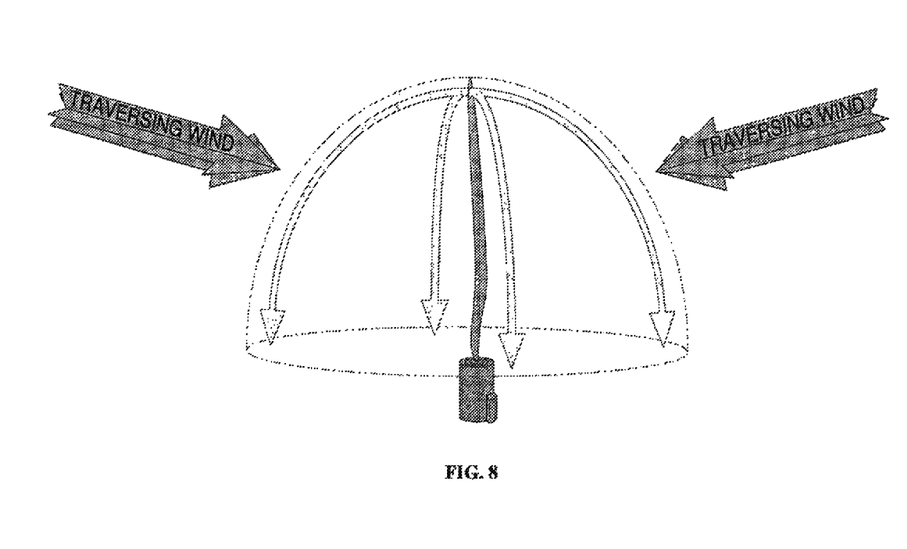
FIG. 8 is an illustration of the omnidirectional wind capture capability of a blade used with the system of FIG. 1 and FIG. 5.

As previously noted, the blade portion 2 may be fabricated to resemble a blade of grass, reed, etc. to approximate the appearance of the surrounding environment. The blade portion 2 may have a surface texture and planform optimized to respond to wind from all directions (see FIG. 8). Although the blade portion 2 of FIG. 1 is shown as having a generally circular cross section, other aerodynamically optimized cross-sections such as oval, square, rectangular or the like may be employed to enhance the blade portion's ability to catch the wind at any angle. FIG. 3 shows an exemplary alternative blade cross-section, in which the blade is arranged in a "cross" pattern.

The blade portion 2 may be made from any of a variety of materials, including carbon fiber, polyetheretherketone (PEEK), polyphenylene sulfide (PPS) or the like. The selected material should have good resistance to extreme temperatures, UV radiation, and other material degrading environmental conditions. The external surface of the blade portion 2 may be relatively smooth, or it may have a mottled or dimpled texture to facilitate parasitic drag to the surrounding airflow.

As an alternative to the illustrated embodiment, in which the blade portion 2 is made of a series of articulated blade elements 12, the blade portion 2 could be made from a solid material that is sufficiently flexible that it can provide the desired motion to the associated generator portion 4. Such flexibility can be provided by using an inherently flexible material, or by making the blade portion 2 very thin.

Where the blade portion 2 is composed of multiple articulated blade elements 12, the elements may be kept in close engagement with each other via the tension applied by line 14. In one embodiment, the line 14 may be connected to the top most element 18 by a mechanical capture. Alternatively, the line 14 may be mold encapsulated or glued to the top most element. The blade portion 2 and blade elements 12 can be any appropriate size to achieve a desired generator configuration (e.g., to resemble a blade of grass, reed, or the like). This is illustrated in FIGS. 7A-7D, in which the blade 2 is shown sized and shaped to resemble types of flora (grain, leaves, etc.)

As previously noted, a proximal end 22 of the line 14 engages the linkage 6 to transmit movement from the blade portion 2 to the generator portion 4. The linkage 6 may have a line connecting end 23 for connecting the linkage to the proximal end 22 of the line 14. The linkage 6 may have an oblique portion 24, a first end of which includes the line connecting end 23, and a second end of which includes a counterweight connecting end 26. The linkage may further have a lateral portion 28, a first end of which comprises the counterweight connecting end 26, and a second end of which comprises a magnet connecting end 30. The oblique portion 24 and the lateral portion 28 may form an acute angle with respect to each other. The lateral portion 28 may have a pivot point 32 located between the counterweight connecting end 26 and the magnet connecting end 30 such that when a force is applied to the linkage 6 via the line 14, the linkage 6 pivots about the pivot point 32, thus raising or lowering the magnet 35, which is engaged with the magnet connecting end 30. A counterweight 34 may be engaged with the counterweight connecting end 26 to balance the magnet 35, so that a neutral linkage position is obtained when the blade portion 2 is in an unbent configuration.

Connections between the linkage 6 and the line 14, the counterweight 34 and the magnet 35 may be pinned connections, hole/hook connections, or the like.

The generator portion 4 may comprise a suitable magnet 35 having an engaging arm 36 configured to connect to the magnet connecting end 30 of the linkage 6. In one embodiment, the magnet 35 is a neodymium (NdFeB) magnet. Neodymium magnets comprise an alloy of neodymium, iron and boron, and are particularly strong permanent magnets, thus making them desirable for the disclosed application. Neodymium magnets have relatively high flux density, and thus they can induce a greater EMF in the windings of the coil portion 8 as compared to other permanent magnet types. Other magnet materials that can also be appropriate for use as the magnet 35, include Samarium cobalt (SmCo), Alnico, and ceramic or ferrite magnets.

In the illustrated embodiment, the coil portion 8 comprises a series of copper windings wrapped around a non-magnetic tubular member sized to accept the magnet 35 therein. Due to the variable nature of the electricity generated by this configuration, a diode rectifier or pulse-width modulation converter 42 may be incorporated at the output of each coil portion 8 (where a multiple-coil array is used) to convert the variable AC current into DC current or condition the AC current for distribution on the array/grid electrical bus(ses). An AC or DC current/voltage output 42 may be provided to channel the flow of generated current to a suitable transmission or collection device. Multiple arrays may be linked in series and/or in parallel as a grid to achieve the desired voltage and current levels.

It will be appreciated that conductive materials other than copper can be used to form the coil portion 8.

An environmental shield 38 may be provided between the blade portion 2 and the linkage 6 to prevent the ingress of moisture and other contaminants into the region containing the generator portion 4, linkage 6, coil portion 8 and wiring 10. The environmental shield 38 may be an elastomeric material, or any other suitable waterproof and sealing material such as fluorosilicone rubber, EPDM (ethylene propylene diene monomer) rubber, or the like.

The counterweight 34 can have a linkage engaging arm 40 for connecting to the counterweight connecting end 26 of the linkage 6. The counterweight 34 may be sized to provide an appropriate neutral position of the magnet 35 about the pivot point 32 so that the magnet 35 does not apply any undue force on the blade portion 2. The counterweight 34 also provides an appropriate righting force on the blade portion 2 so that the blade portion 2 tends to return to a neutral, upright, position when a wind force is removed. This may result in a swaying of the blade portion 2 as the wind impinges on it. The swaying causes the magnet 35 to move within the coil portion 8, generating current in the windings.

Figure 2:
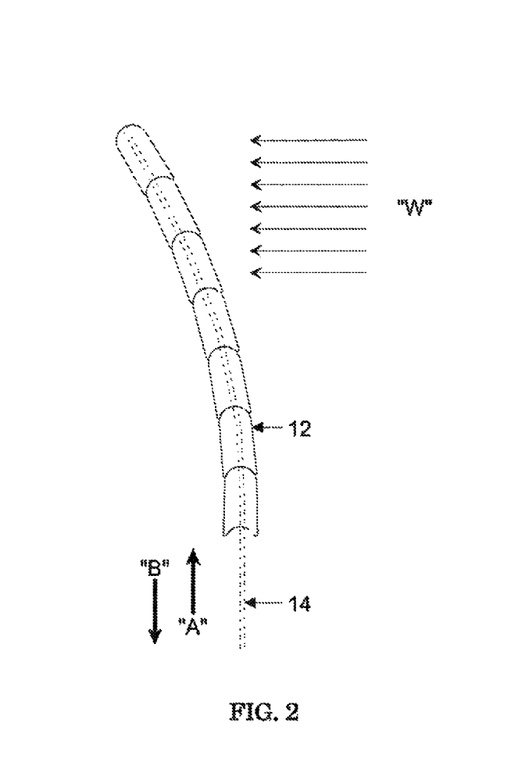
FIG. 2 is a side view of a portion of the system of FIG. 1.

Thus arranged, when the blade portion 2 is subjected to a wind force (arrows "W" in FIG. 2), the articulated blade elements 12 move in a manner illustrated in FIG. 2. This movement causes the line 14 to move upward in the direction shown by arrow "A." The line 14 movement causes a corresponding pivoting movement in the linkage 6, which results in the magnet 35 moving down within the coil portion 8, thus generating current in the copper windings of the coil portion. When the wind force is reduced, the counterweight 34 causes the linkage 6 to pivot back toward its original position, which causes the line 14 to move downward in the direction shown by arrow "B." The magnet 35 thus moves upward within the coil portion 8, generating additional current in the copper windings. This reciprocating movement continues as long as the wind impinges on the blade portion 2.

Figure 4:
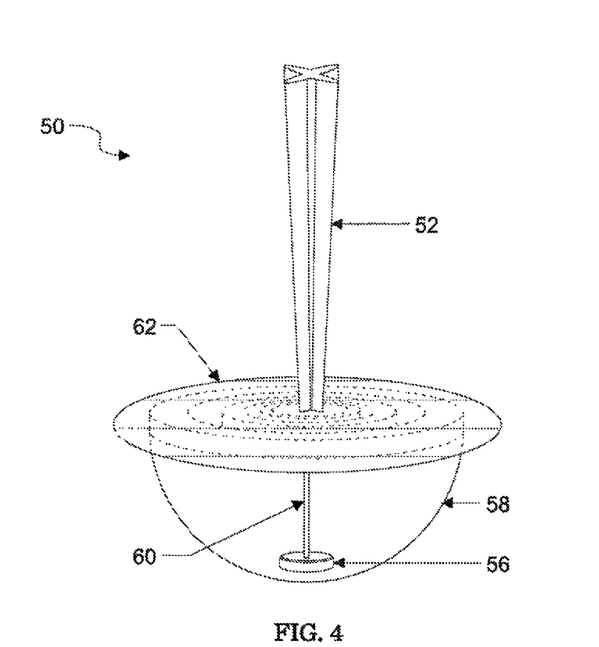
FIG. 4 is a partial cutaway isometric view of a second exemplary embodiment of a novel wind energy conversion system.
Figure 5:
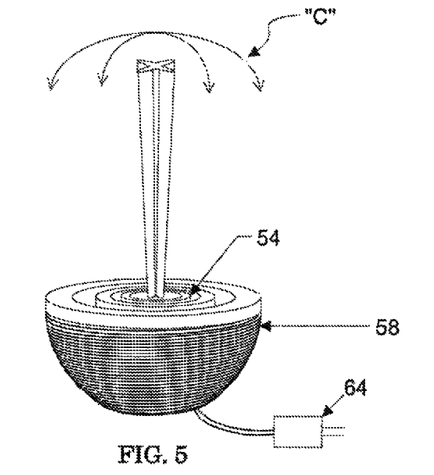
FIG. 5 is a second isometric view of the system of FIG. 4.

Referring now to FIGS. 4 and 5, an alternative embodiment of a wind generator. Generator 50 may comprise a blade portion 52, an articulating gimbal 54, a magnet portion 56, and a coil portion 58. In this embodiment, the blade portion 52 may be substantially rigid, and may be substantially rigidly connected to the magnet portion 56 via a support beam 60. The blade portion 52 and/or support beam 60 may be connected to the gimbal so they are axially fixed, but remain free to pivot about the gimbal when wind forces are applied to the blade. In this embodiment, the pivot point is the center of the gimbal 54, and the magnet portion 56 simultaneously acts as a counterweight which self-rights the blade portion 52 when the wind forces are reduced. An environmental shield 62 may be provided above the gimbal to protect the magnet portion 56, coil portion 58, and support beam 60 from moisture and contaminants.

The coil portion 58 comprises a plurality of copper windings formed in a swept hemispheric arrangement so that as the magnet portion 56 oscillates with the blade portion 52 (see arrows "C"), the magnet portion 56 also oscillates with respect to the coil portion 58, inducing a current in the windings of the coil portion 58. A diode rectifier or pulse-width modulation converter 64 may be incorporated at the output of each coil portion 58 to convert the variable AC current into DC current or condition the AC current for distribution on the array/grid electrical bus(ses).

As with the embodiment of FIG. 1, the blade portion 52 may have a cross-sectional shape configured to catch the wind from any direction. In the illustrated embodiment, the blade portion 52 has a cross-shape similar to that described in relation to FIG. 3.

Figure 6:
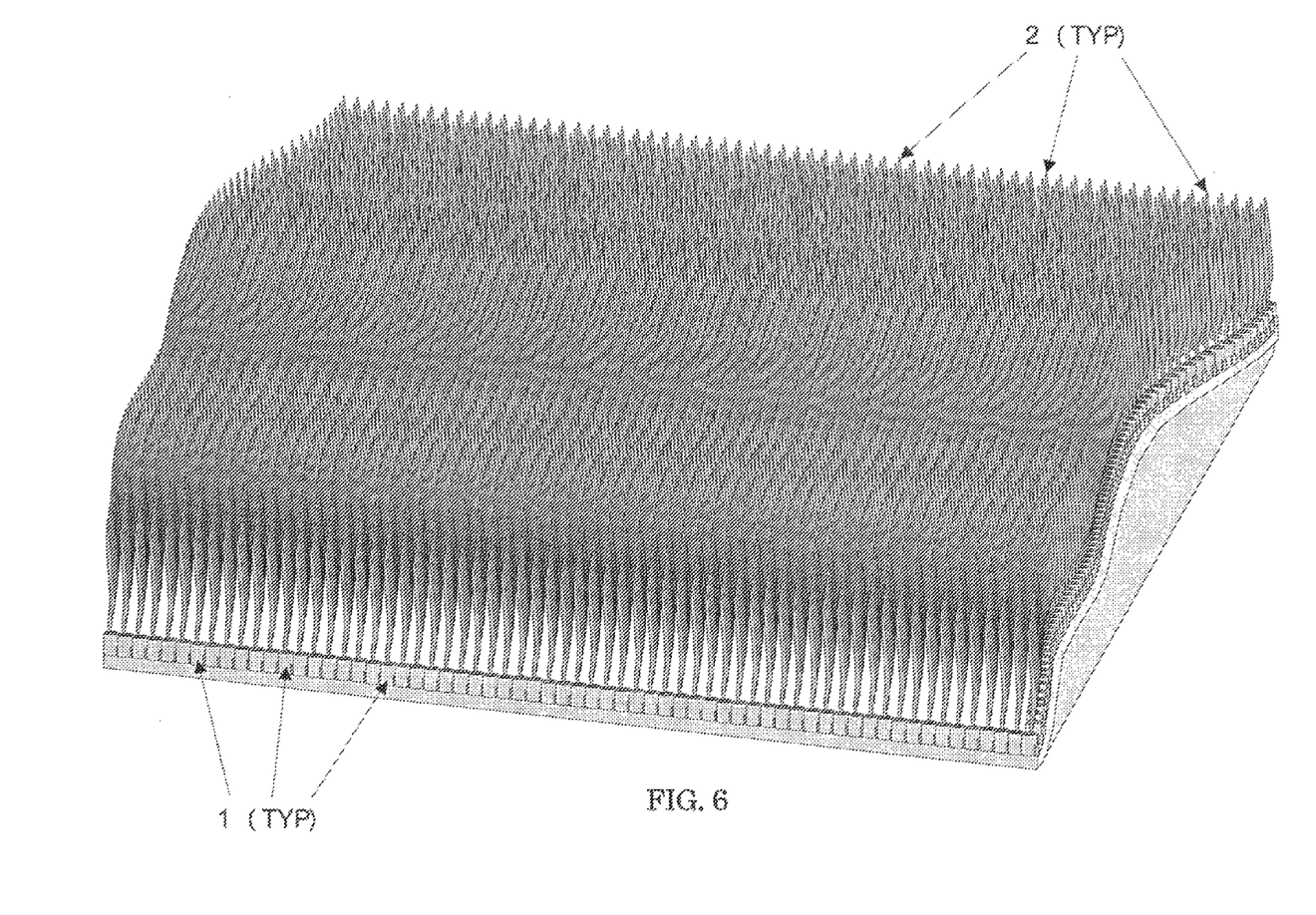
FIG. 6 is an exemplary illustration of the system of FIG. 1 composed in a grid that follows the topology of the installation site.
Figures 7A, 7B, 7C, 7E, 7F:
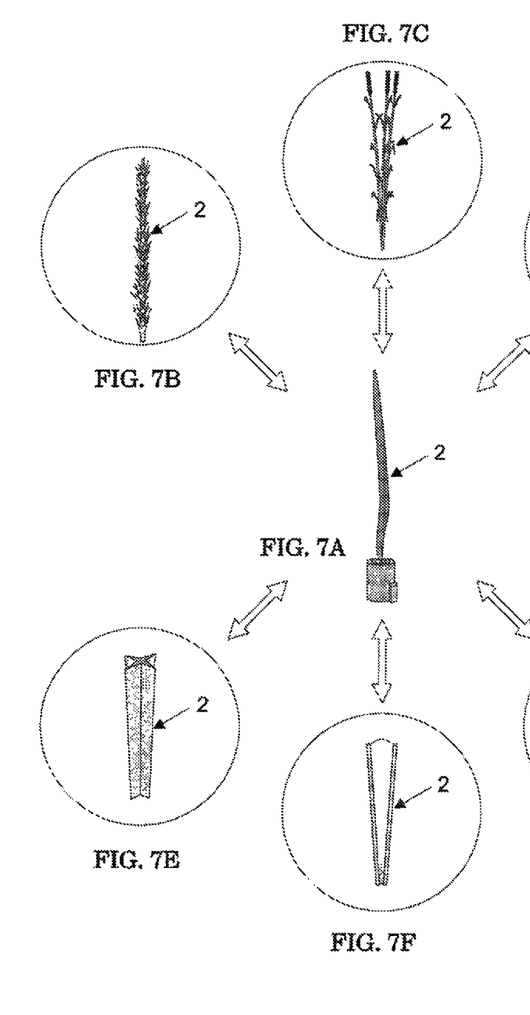
FIGS. 7A-G are illustrations of various blade options for accommodating different installation environments and landscape settings.
Figure 7D:
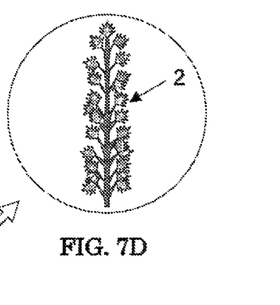
Figure 7G:
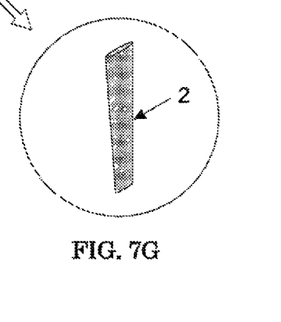
Figure 9:
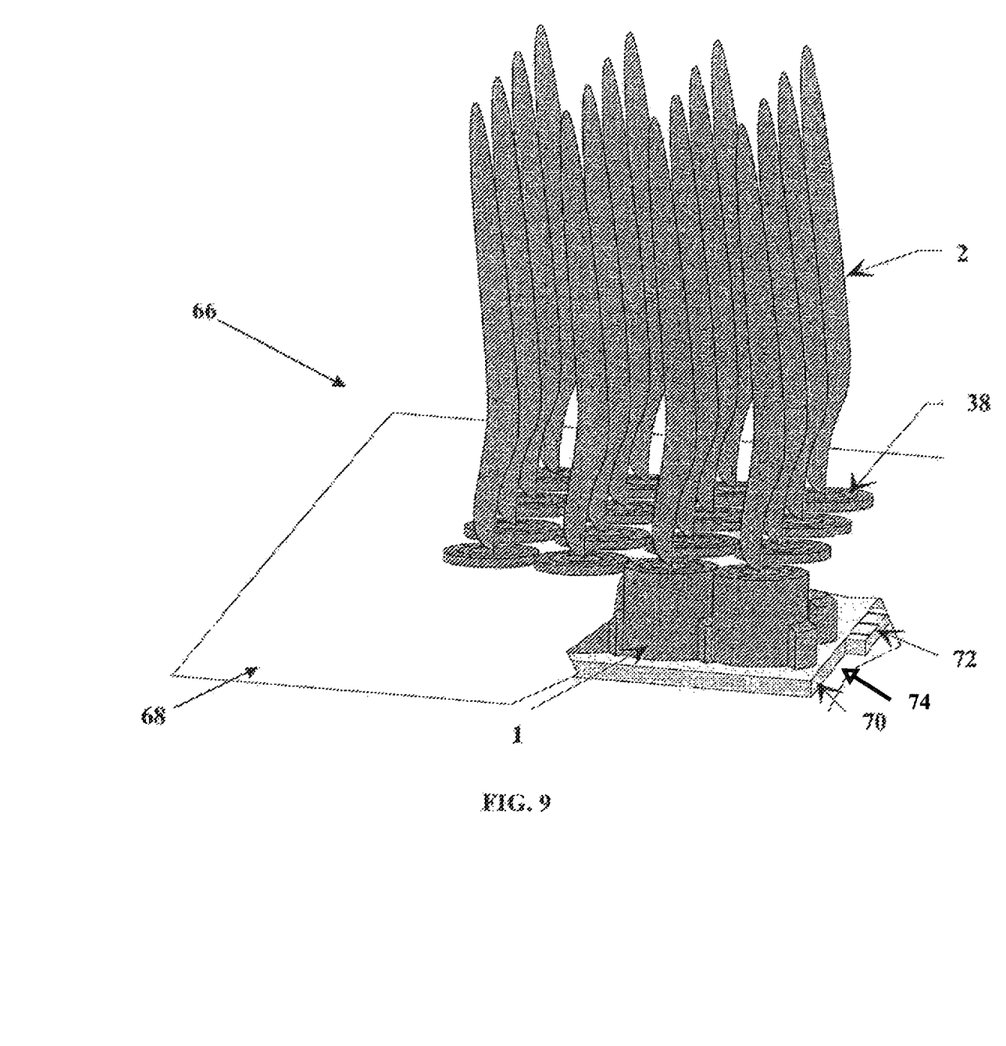
FIG. 9 is an illustration of an exemplary surface wind electrical power operational generation array using the system of FIG. 1.

It will be appreciated that each generator 1 can be built in a very small form factor, thus permitting the fabrication of modular arrays resembling small patches or areas of grass, reeds, etc. These modular arrays can be connected together to form a grid or arrays conforming to the contours, depressions, and elevations of the site on which the grid is situated, thus giving the grid the appearance of "rolling hills" of grass or wheat. One such arrangement is shown in FIGS. 6 and 9. FIG. 6 shows the final appearance of such a "rolling hill" arrangement that conforms to the local topography. FIG. 9 is an illustration of haw an operational generation array (OGA) 66 can be fabricated from a plurality of individual generators 1. Each generator 1 is shown as having an associated blade 2 and environmental shield 38 connected to a lightweight ground cover 68. The generators 1 are mounted to the OGA frame 70 which is disposed beneath the ground cover 68. The OGA has an electrical connection point 72 to enable it to electrically interconnect with adjacent OGAs to form a much larger assembled unit (i.e., a grid). The OGA has an electrical bus 74 contained in frame 70 to enable electrical connections to be made to/from the individual generators 1. As will be appreciated, this technology can be adapted to the unusable land on hillsides and deserts, so as to capitalize on the surface winds transitioning these areas. In addition, this technology can be adapted to the unused area of roofs or other structures that are, otherwise, unproductive.

Although the system has been described in terms of exemplary embodiments, it is not limited thereto. The features of the system have been disclosed, and further variations will be apparent to persons skilled in the art. All such variations are considered to be within the scope of the appended claims. Reference should be made to the appended claims, rather than the foregoing specification, as indicating the true scope of the disclosed system. The appended claims should be construed broadly, to include such other variants and embodiments of the invention which may be made by those skilled in the art without departing from the scope and range of equivalents of the invention.

What is claimed is:

1. A system for generating electricity, comprising: an elongated blade portion having first and second longitudinal ends defining a length of said blade portion greater than its width, the blade portion configured to movably tilt bend or moveably swing with respect to a horizontal plane under the influence of wind motion; a magnet portion; and a coil portion; wherein the blade portion is associated with the magnet portion such that bend or swing movement of the blade portion causes movement of the magnet portion; wherein the magnet portion induces a current in the coil portion.

2. The system of claim 1, wherein the coil portion comprises a plurality of wire windings surrounding a cylindrical core.

3. The system of claim 1, wherein the coil portion comprises a plurality of wire windings formed in a hemispherical configuration.

4. The system of claim 1, wherein the blade portion comprises a plurality of stacked blade elements and a line;
    wherein the line is disposed within the plurality of stacked blade elements,
    wherein a distal end of the line is engaged with a top element of the plurality of stacked blade elements; and
    wherein a proximal end of the line is associated with the magnet portion such that a bending movement of the blade portion causes the line to reciprocate with respect to the blade elements to cause said movement of the magnet portion.

5. The system of claim 1, wherein the blade portion is substantially rigid;
    wherein the blade portion is connected to a gimbal; and
    wherein the blade portion has an aerodynamic feature for self-righting the blade when in a near-horizontal position caused by constant or steady wind conditions.

6. The system of claim 1, further comprising a gimbal connected between said blade portion and said magnet portion.

7. The system of claim 1, further comprising a pivoting linkage connecting the blade portion and the magnet portion.

8. The system of claim 1, wherein the blade portion has a cross section selected from the list consisting of cylindrical, oval, and x-shaped.

9. The system of claim 1, wherein the magnet portion comprises a neodymium magnet.

10. The system of claim 1, wherein the blade portion has a surface texture configured to enhance the force applied to the blade portion by an impinging fluid or medium.

11. The system of claim 1, further comprising a diode rectifier at an output of the coil portion to convert variable AC current from the coil portion to DC.

12. The system of claim 1, further comprising a pulse-width modulation converter at an output of the coil portion to condition a variable AC current from the coil portion to employable AC current.

13. A system for generating electricity, comprising: a plurality of generators, each generator comprising an elongated blade portion, a magnet portion, and a coil portion; wherein each blade portion includes first and second longitudinal ends defining a length of said blade portion greater than its width, the blade portion configured to movably tilt bend or moveably swing with respect to a horizontal plane under the influence of wind motion, each blade portion connected to an associated magnet portion such that bend or swing movement of the blade portion causes movement of the magnet portion; wherein each magnet portion is disposed in relation to an associated coil portion such that movement of the magnet portion induces a current in the coil portion; and wherein the system further comprises a diode rectifier or a pulse-width modulation converter at an output of the coil portions to either convert AC current to DC current or condition a variable AC current into employable AC current.

14. The system of claim 13, wherein each coil portion comprises a plurality of wire windings surrounding a cylindrical core.

15. The system of claim 13, wherein each coil portion comprises a plurality of wire windings formed in a hemispherical configuration.

16. The system of claim 13, wherein each blade portion comprises a plurality of stacked blade elements and a line;
    wherein the line is disposed within the plurality of stacked blade elements,
    wherein a distal end of the line is engaged with a top element of the plurality of stacked blade elements; and
    wherein a proximal end of the line is associated with the associated magnet portion such that a bending movement of the blade portion causes the line to reciprocate with respect to the blade elements to cause said movement of the magnet portion.

17. The system of claim 13, wherein each blade portion is substantially rigid;
    wherein the blade portion is connected to a gimbal; and
    wherein the blade portion has an aerodynamic feature for self-righting the blade when in a near-horizontal position caused by constant or steady wind conditions.

18. The system of claim 13, wherein each generator further comprises a gimbal connected between one of said blade portions and the associated magnet portion.

19. The system of claim 13, further comprising a pivoting linkage connecting each of said blade portions and the associated magnet portion.

20. The system of claim 13, wherein each blade portion has a cross section selected from the list consisting of cylindrical, oval and x-shaped.

21. The system of claim 13, wherein each magnet portion comprises a neodymium magnet.

22. The system of claim 13, wherein each blade portion has a surface texture configured to enhance the force applied to the blade portion by an impinging fluid or medium.

23. A modular array comprising a support frame, an electrical bus, means for connecting to other arrays, and a plurality of the systems of claim 13.

24. The modular array of claim 23, wherein the modular array forms a building block for a plurality of arrays that physically and electrically interconnect to form a grid for generating electricity.

25. The modular array of claim 24, wherein the plurality of arrays comprising the grid conform to a topology of an installation site.

* * * * *

UNITED STATES PATENT AND TRADEMARK OFFICE
CERTIFICATE OF CORRECTION

PATENT NO. : 8,497,595 B1
APPLICATION NO. : 12/618870
DATED : July 30, 2013
INVENTOR(S) : Michael F. Petner et al.

Page 1 of 1

It is certified that error appears in the above-identified patent and that said Letters Patent is hereby corrected as shown below:

On the Title Page:

In the Inventors Item (75) first inventor's state should read "NJ".

In the Claims:

Column 7, Line 28, Claim 1, remove "movably tilt".
Column 8, Line 16, Claim 13, remove "movably tilt".

Signed and Sealed this
Eighth Day of October, 2013

Teresa Stanek Rea
*Deputy Director of the United States Patent and Trademark Office*